Patented Feb. 18, 1930

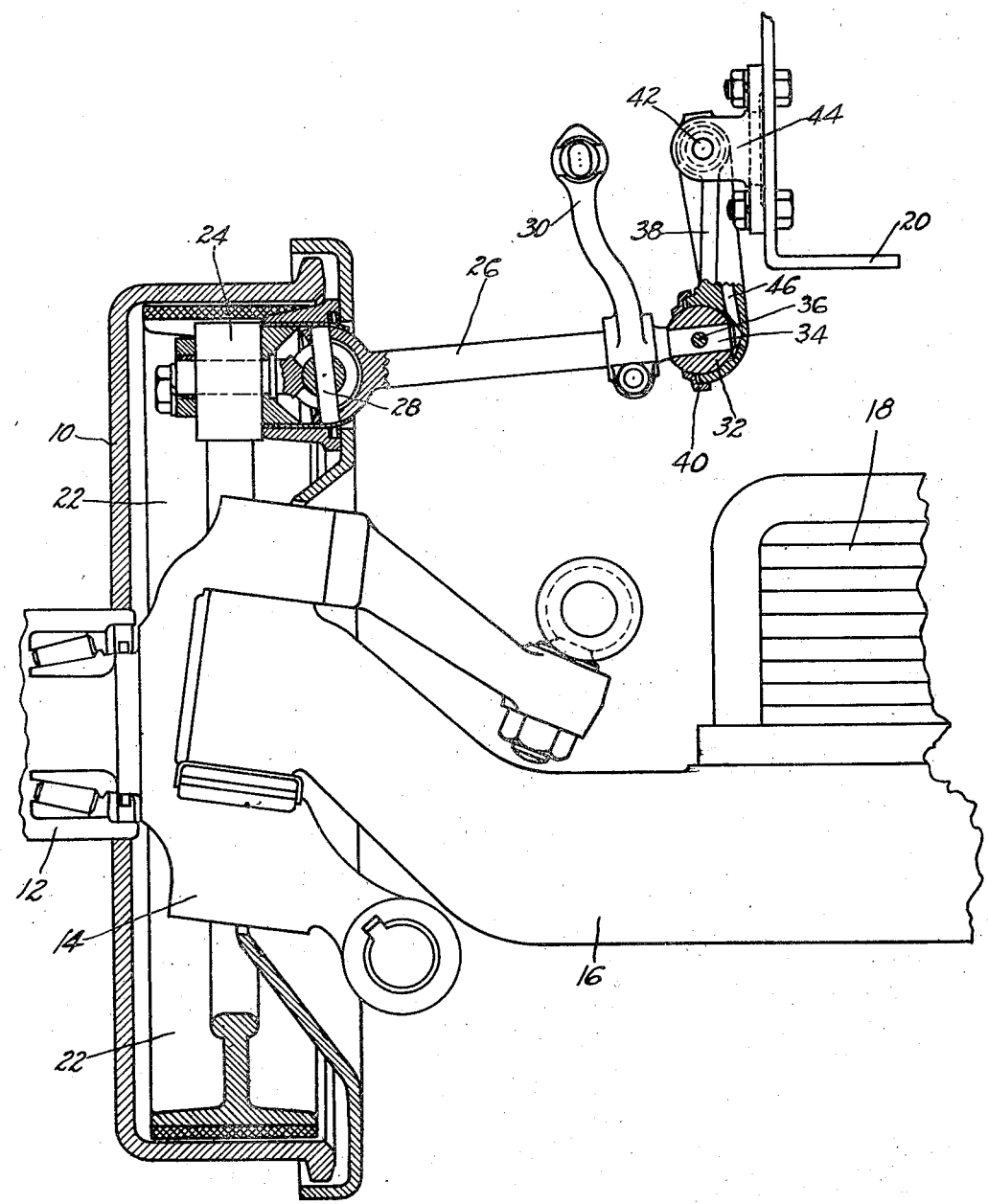

1,747,354

UNITED STATES PATENT OFFICE

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS

BRAKE-OPERATING CONNECTION

Application filed July 16, 1925. Serial No. 43,953.

This invention relates to connections for operating a brake on a swivelled vehicle wheel and has for its particular object the elimination of sliding joints in the usual front wheel brake control. In one desirable arrangement the inner end of the brake-operating shaft is universally connected to an arm pivotally mounted on the chassis frame, preferably for swinging movement in a vertical plane substantially at right angles to the chassis frame to compensate for movement due to the springs.

The above and other objects and features of the invention, including various novel combinations of parts and desirable particular constructions, will be apparent from the following description of one illustrative embodiment shown in the accompanying drawings, in which:
The figure is a transverse vertical section through the brake and adjacent parts of the vehicle, showing the control partly in vertical section and partly in rear elevation.

In the arrangement selected for illustration the brake itself includes a drum 10 rotating with a wheel the hub of which is shown at 12, and which is rotatably supported by a knuckle 14 swivelled by means of the usual king-pin at one end of the front axle 16.
The front axle, together with the rear axle (not shown), support through the usual springs 18 the chassis frame 20. The brake is shown as including shoes 22 arranged inside of the drum 10 and expanded against the drum to apply the brake by means such as a double cam 24. Except as further described below, the above-identified parts may be of any desired construction.

The cam 24 or its equivalent is operated by a horizontal shaft 26 shown as universally jointed at 28 substantially in the swivelling axis to the shaft operating the cam 24, the shaft 26 being rocked to apply the brake by suitable connections attached to an arm 30.
The inner end of the shaft 26 is formed with a ball part, either formed on the end of the shaft or made as a separate ball member 32 perforated to slide over a cylindrically reduced portion 34 on the end of shaft 26, the ball member 32 being held by a pin or the like 36. The ball member 32 forms part of a universal joint, the other part being a socket formed partly in one end of the arm 38 and partly by a cap 40 secured to the arm. The arm 38 is pivoted at 42 on a bracket 44 bolted or otherwise secured to the chassis frame 20, the arrangement being preferably such that the arm 38 swings in a substantially vertical plane perpendicular to the chassis frame member 20. Arm 38 may be formed with one or more passages 46 for lubricant for the universal joint described above.

While one illustrative embodiment of the invention has been described in detail, it is not my intention to limit its scope to that particular embodiment or otherwise than by the terms of the appended claims.

I claim:

1. A vehicle having a wheel with a brake and having a chassis frame and comprising, in combination therewith, a shaft operating the brake and having one end adjacent the frame, and a supporting arm pivotally connected to the frame for movement in a vertical plane and having a universal connection to the end of the shaft.

2. A vehicle having a swivelled wheel with a brake and having a chassis frame and comprising, in combination therewith, a horizontal operating shaft for the brake universally jointed substantially in the swivelling axis of the wheel, and a supporting arm universally connected to the inner end of the shaft and pivoted to the chassis frame to swing substantially in a vertical plane at right angles to the chassis frame to compensate for movement due to the vehicle springs.

3. In a motor vehicle, the combination with the frame and axle, of a rock shaft connected by a universal joint with the brake on the axle, a bracket on the lower part of the frame, an arm pivoted to said bracket to swing in a vertical plane, said arm having a ball socket, and means mounted on said rock shaft and forming a ball end mounted in said socket.

4. In combination with a motor vehicle, an axle vertically movable, a brake on said axle, an actuating device for said brake having a ball thereon, a frame, and a link adapted to connect said frame and said device, said link including a socket adapted to receive said ball for permitting limited universal movement of said device and a pivot between said frame and link adapted to permit additional movement of said device in a vertical plane.

In testimony whereof I have hereunto signed my name.

ADIEL Y. DODGE.